(12) United States Patent
Vaidyanathan et al.

(10) Patent No.: US 11,802,734 B2
(45) Date of Patent: Oct. 31, 2023

(54) THERMAL MANAGEMENT SYSTEM AND METHOD

(71) Applicant: Transportation IP Holdings, LLC, Norwalk, CT (US)

(72) Inventors: Krishnamurthy Vaidyanathan, Bengaluru (IN); Partho Kayal, Bengaluru (IN); Mahantesh Mallappa Hosur, Bengaluru (IN); Naren Dhass S, Bengaluru (IN); Balaji Hosadurgam Ravindranath, Mysore (IN)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 187 days.

(21) Appl. No.: 17/204,507

(22) Filed: Mar. 17, 2021

(65) Prior Publication Data
US 2022/0065539 A1 Mar. 3, 2022

Related U.S. Application Data

(60) Provisional application No. 63/074,105, filed on Sep. 3, 2020.

(51) Int. Cl.
*F28D 1/053* (2006.01)
*F28F 1/02* (2006.01)
(Continued)

(52) U.S. Cl.
CPC ............ *F28D 1/0535* (2013.01); *F28F 1/022* (2013.01); *F28F 1/34* (2013.01); *F28F 1/38* (2013.01);
(Continued)

(58) Field of Classification Search
CPC ...... F28F 2255/00; F28F 2215/00; F28F 1/38; F28F 1/34; F28F 1/022; F28F 1/0535
See application file for complete search history.

(56) References Cited

U.S. PATENT DOCUMENTS 1,741,930 A * 12/1929 Gnagi ..................... F28F 1/24
165/57
1,860,573 A * 5/1932 Deutsch ............... F28D 1/0535
165/53
(Continued)

FOREIGN PATENT DOCUMENTS

EP 3211358 A1 8/2017
EP 3265738 A1 1/2018
(Continued)

OTHER PUBLICATIONS

First Examination Report dated Mar. 30, 2022 for corresponding Indian Patent Application No. 202114035876 (5 pages).
(Continued)

*Primary Examiner* — Devon Russell
(74) *Attorney, Agent, or Firm* — The Small Patent Law Group LLC; Christopher R. Carroll

(57) ABSTRACT

A thermal management system includes a plurality of thermal management assemblies. Each of the thermal management assemblies has a monolithic foil structure having a body with an external surface and a differently shaped and opposing internal surface. The external surface forms an outer profile and the internal surface forming an internal conduit with the outer profile and the internal conduit having different shapes. The monolithic foil structure is configured to physically isolate a first fluid flowing along the external surface from a second fluid flowing in the internal conduit. The body is configured to transfer thermal energy between the first fluid flowing along the external surface and the second fluid flowing in the internal conduit.

20 Claims, 8 Drawing Sheets

(51) Int. Cl.
  F28F 1/34 (2006.01)
  F28F 1/38 (2006.01)
(52) U.S. Cl.
  CPC ....... *F28F 2215/00* (2013.01); *F28F 2255/00* (2013.01)

(56) References Cited

U.S. PATENT DOCUMENTS

| | | | | |
|---|---|---|---|---|
| 1,874,009 | A * | 8/1932 | Henshall | F28F 1/24 165/181 |
| 1,953,324 | A * | 4/1934 | Wentworth | F28F 1/34 165/130 |
| 2,011,900 | A * | 8/1935 | Laird | F28D 1/0535 165/172 |
| 3,981,354 | A * | 9/1976 | Haberski | F28F 1/26 165/181 |
| 7,866,377 | B2 * | 1/2011 | Slaughter | F28F 7/02 700/120 |
| 9,134,072 | B2 | 9/2015 | Roisin et al. | |
| 9,200,855 | B2 | 12/2015 | Kington et al. | |
| 9,447,484 | B2 * | 9/2016 | Kington | B33Y 10/00 |
| 9,752,835 | B2 * | 9/2017 | Waldman | F28F 5/00 |
| 10,843,267 | B2 | 11/2020 | Davidson et al. | |
| 2002/0066554 | A1 * | 6/2002 | Oh | F28D 1/0535 165/172 |
| 2009/0296345 | A1 * | 12/2009 | Nguyen | F28F 3/12 361/689 |
| 2016/0231064 | A1 * | 8/2016 | Kironn | F28F 1/025 |
| 2017/0082372 | A1 | 3/2017 | Vos et al. | |
| 2017/0089643 | A1 | 3/2017 | Arafat | |
| 2017/0131034 | A1 | 5/2017 | Ribarov et al. | |
| 2017/0167805 | A1 | 6/2017 | Alvarez et al. | |
| 2018/0258779 | A1 * | 9/2018 | Boutaleb | F01D 25/12 |

FOREIGN PATENT DOCUMENTS

| | | |
|---|---|---|
| EP | 3312538 A1 | 4/2018 |
| KR | 20050061306 A | 6/2005 |
| WO | 2017165921 A1 | 10/2017 |

OTHER PUBLICATIONS

Bacellar, "Novel Airside Heat Transfer Surface Designs Using an Integrated Multi-Scale Analysis with Topology and Shape Optimization", Purdue University, Purdue e-Pubs, 2016 (9 pages).
Cunningham, "Metal 3D printing likely to offer greatest benefit to thermal parts" Published: Mar. 10, 2017 https://www.eurekamagazine.co.uk/design-engineering-news/metal-3d-printing-likely-to-offer-greatest-benefit-to-thermal-parts/152437/ (3 pages).
Khoshvaght, "3D-CFD simulation and neural network model for the j and f factors of the wavy fin-and-flat tube heat exchangers" vol. 28, No. 03, pp. 505-520, Jul.-Sep. 2011 (17 pages).
Mech Lectures, "Choose-Micro-Channel-Heat-Exchangers-large" Jun. 13, 2017, https://www.mechlectures.com/heat-exchanger-types/choose-micro-channel-heat-exchangers-large/ (2 pages).
Radermacher, "Miniaturized Air-to-Refrigerant Heat Exchangers", 2016 Building Technologies Office Peer Review (30 pages).
Andy Ko et al, "A-7 Strut Braced Wing Concept Transonic Wing Design", VPI-AOE-275, Jul. 12, 2002 (168 pages).
Airfoil Tools, "GOE 134 (MVA H.12) Airfoil (goe134-il)" airfoiltools.com/airboil/details?airfoil=goe134-il (3 pages), Date: Mar. 2023.
3D Systems, "Direct Metal 3D Printing Enables CEEE to Manufacture Lean and Green Heat Exchanger" https://www.3dsystems.com/learning-center/case studies/direct-metal-printing-dmp-enables-ceee-manufacture-lean-and-green-heat (4 pages) date unknown; available at least as early as Mar. 10, 2021).
Green HP "Heat Exchangers for Next Generation Heat Pump" Grant Agreement No. 308816, FP7-Energy-2012-308816 www.greenhp.eu (19 pages) date unknown; available at least as early as Mar. 10, 2021).
Renishaw, "Additive manufacturing crosses the finishing line" https://www.renishaw.com/en/additive-manufacturing-crosses-the-finishing-line-38971 (5 pages) date unknown; available at least as early as Mar. 10, 2021).
Saltzman, "Experimental Comparison of a Traditionally Built versus Additively Manufactured Aircraft Heat Exchanger" (11 pages) Jan. 5, 2017.
Umn, "3D Printable Heat Exchanger", IP Status: Pending US Patent; Application #: U.S. Appl. No. 15/910,459 https://license.umn.edu/product/3d-printable-heat-exchanger (2 pages) date unknown; available at least as early as Mar. 10, 2021).

* cited by examiner

THERMAL MANAGEMENT SYSTEM AND METHOD

CROSS-REFERENCE TO RELATED APPLICATIONS

This application claims priority to U.S. Provisional Application No. 63/074,105 filed 3 Sep. 2020, hereby incorporated by reference herein.

BACKGROUND

Technical Field

The subject matter described herein relates to thermal management systems and associated methods that exchange heat between different bodies or volumes.

Discussion of Art

Exchangers may be used in a multitude of applications such as locomotives, marine vessels, genset, radiators, turbomachines, etc., to, for example, transfer heat between different bodies or volumes. For example, a first fluid (e.g., liquid or gas) at a relatively high temperature may pass through a first passageway, while a second fluid (e.g., liquid or gas) at a relatively low temperature may pass through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers may include a large number of fluid passageways, each fluid passageway being formed using some combination of plates, channels, bars, foils, fins, manifolds, and the like. Each of these parts may need to be individually positioned, oriented, and connected to the supporting structure, e.g., via brazing, welding, or another joining method. The manufacturing time and costs associated with the assembly of such a heat exchanger can be high and the likelihood of fluid leaks between the fluid passageways or from the heat exchanger can be increased due to the number of joints formed. Additionally, based on manufacturing considerations (e.g., convenience, performance, etc.), some known heat exchangers are formed using extruded stock (e.g., extruded tubes, fins, etc.). Such manufacturing techniques may constrain the number, size, and configuration of heat exchanger features that may be included in the heat exchanger, e.g., within the fluid passageways. For example, there are limitations in spatial arrangements based on using extruded stock (e.g., straight tubes, etc.) and being limited to standard cross-sections (e.g., circular, tubular, etc.). Limitations in spatial arrangements and lowered thermal conductivity due to joining techniques (e.g., brazing, welding, etc.) may lead to decreased performance (e.g., thermal performance) of the finished heat exchanger. Decreased performance due to such limitations require a corresponding increase in heat exchanger size to achieve the same performance. Furthermore, heat exchanger size may be a constraint in applications where there is limited space. It may be desirable to have a system that differs from those that are currently available.

BRIEF DESCRIPTION

In one embodiment, a thermal management system includes a plurality of thermal management assemblies. Each of the thermal management assemblies has a monolithic foil structure having a body with an external surface and a differently shaped and opposing internal surface. The external surface forms an outer profile and the internal surface forming an internal conduit with the outer profile and the internal conduit having different shapes. The monolithic foil structure is configured to physically isolate a first fluid flowing along the external surface from a second fluid flowing in the internal conduit. The body is configured to transfer thermal energy between the first fluid flowing along the external surface and the second fluid flowing in the internal conduit.

In accordance with one or more embodiments described herein, a system (e.g., a thermal management system) includes a monolithic foil structure. The monolithic foil structure has a body with opposite external and internal surfaces that, respectively, form an outer profile and an internal conduit having different shapes. The monolithic foil structure is configured to physically isolate a first fluid flowing along the external surface from a second fluid flowing in the internal conduit (and vice-versa).

In accordance with one or more embodiments described herein, an assembly (e.g., radiator, or other heat exchanger, or other thermal management assembly) includes a plurality of monolithic foil structures. Each of the monolithic foil structures has a body with opposite external and internal surfaces that, respectively, form an outer profile and an internal conduit having different shapes. The internal surface of the body extends from an inlet end of the body to an opposite outlet end of the body. The monolithic foil structure is configured to physically isolate a first fluid flowing along the external surface from a second fluid flowing in the internal conduit; the body transfers thermal energy between the fluid flowing along external surface and the fluid flowing in the internal conduit.

In accordance with one or more embodiments herein, a method (e.g., a method of manufacturing a thermal management device or apparatus) includes forming a first layer of material on a build platform and forming one or more additional, second layers of the material above the first layer to additively manufacture a monolithic foil structure. The monolithic foil structure has a body with opposite external and internal surfaces that, respectively, form an outer profile and an internal conduit having different shapes. In use, the monolithic foil structure is configured to physically isolate a first fluid flowing along the external surface from a second fluid flowing in the internal conduit.

BRIEF DESCRIPTION OF THE DRAWINGS

The present inventive subject matter will be better understood from reading the following description of example embodiments, with reference to the attached drawings, wherein below.

DETAILED DESCRIPTION

One or more embodiments of the inventive subject matter described herein provide for high performance thermal management systems (e.g., heat exchangers). In some embodiments, these thermal management systems are relatively lightweight, compact, and have a high surface area-to-volume ratio. In one or more embodiments, such systems and methods provide thermal management systems that increase volumetric heat transfer efficiency relative to some known heat exchangers. Increasing the volumetric heat transfer efficiency of a thermal management system enables the creation of compact thermal management systems for given applications, freeing up valuable real estate that can be used for other application-based aggregates competing for space. In one example, in a battery-powered vehicle, a compact heat exchanger in accordance with the inventive subject matter may free up space for implementing additional batteries, providing more energy to travel longer distances than in battery-powered vehicles with some known heat exchangers. Other embodiments are shown and described herein.

One or more embodiments of the inventive subject matter described herein provide for thermal management systems with structurally strong joints that can withstand a greater degree of thermal and mechanical stresses due to thermal gradients and pressure variations during use. In some examples, the heat exchangers eliminate seams and bimaterial joints (e.g., two or more materials that form the joint) that reduce thermal conductivity in some known heat exchangers. Additionally or alternatively, one or more embodiments of the inventive subject matter described herein provide for system and methods that enable thermal management systems having improved shapes, sizes, and/or spatial arrangements of components (e.g., fins, tubes, etc.) that increase the volumetric heat transfer efficiency and/or gravimetric efficiency and/or use the same or less energy to manage heat, resulting in operational efficiency gains. Additionally or alternatively, one or more embodiments of the inventive subject matter described herein provide for systems and methods that enable additive manufacturing of all of or portion of thermal management systems described herein.

Figure 1A:
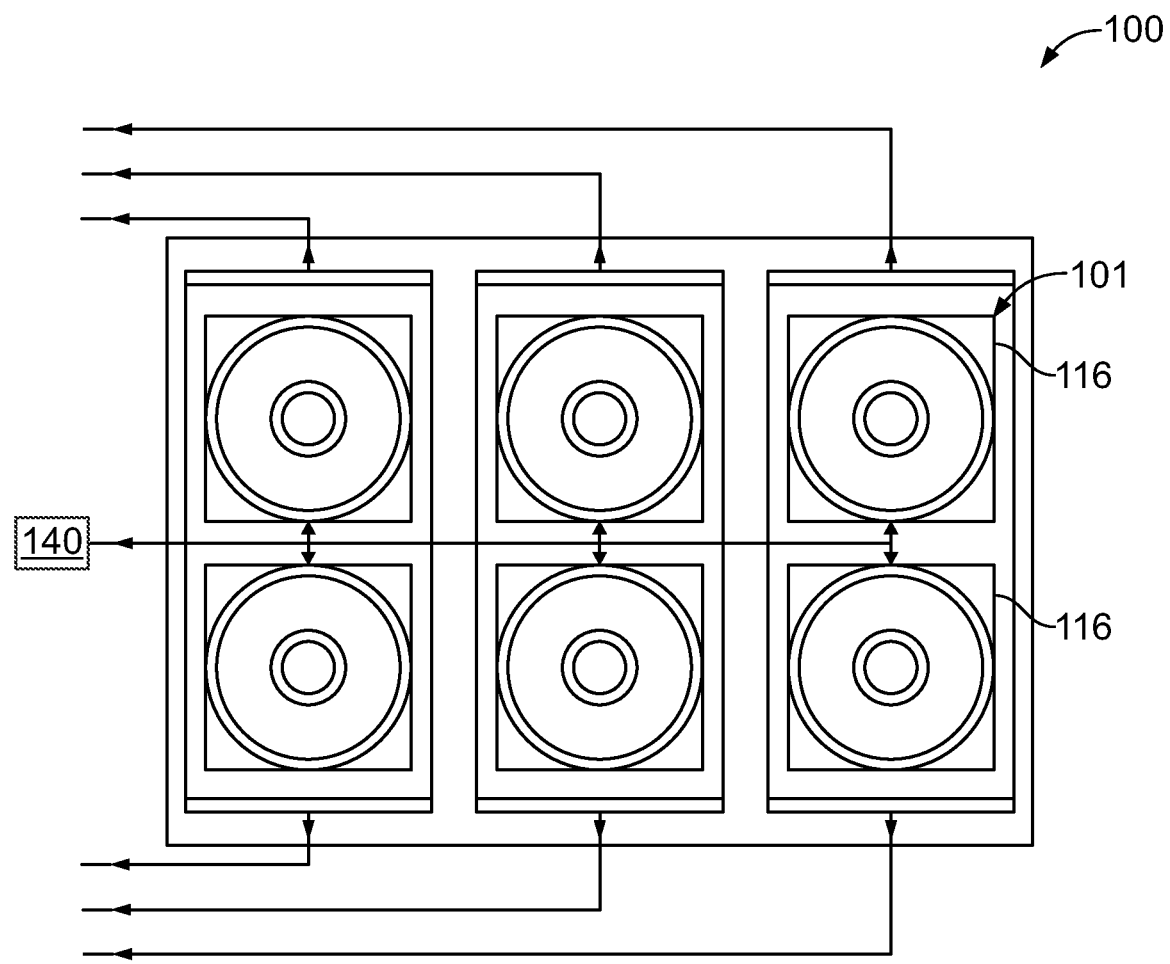
FIGS. 1A, 1B, and 1C illustrate examples of thermal management systems including a plurality of monolithic foil structures in accordance with one or more embodiments described herein.
Figure 1B:
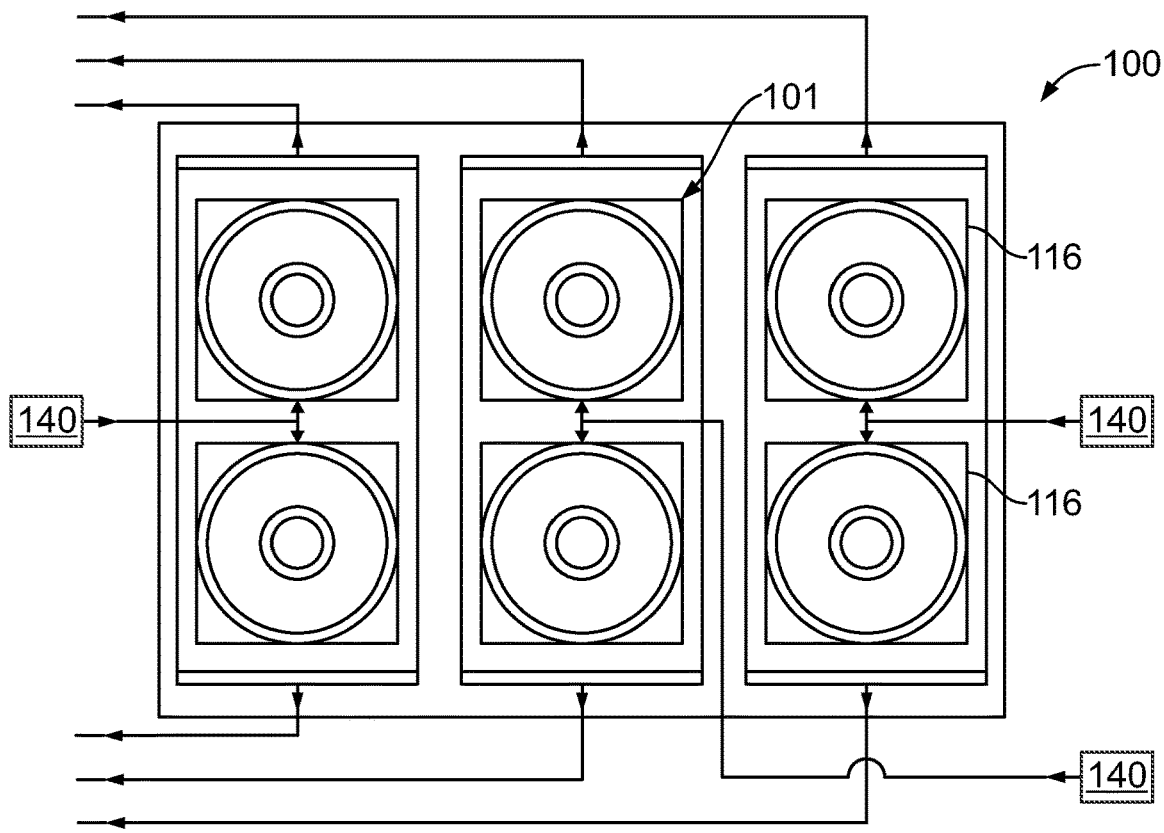
Figure 1C:
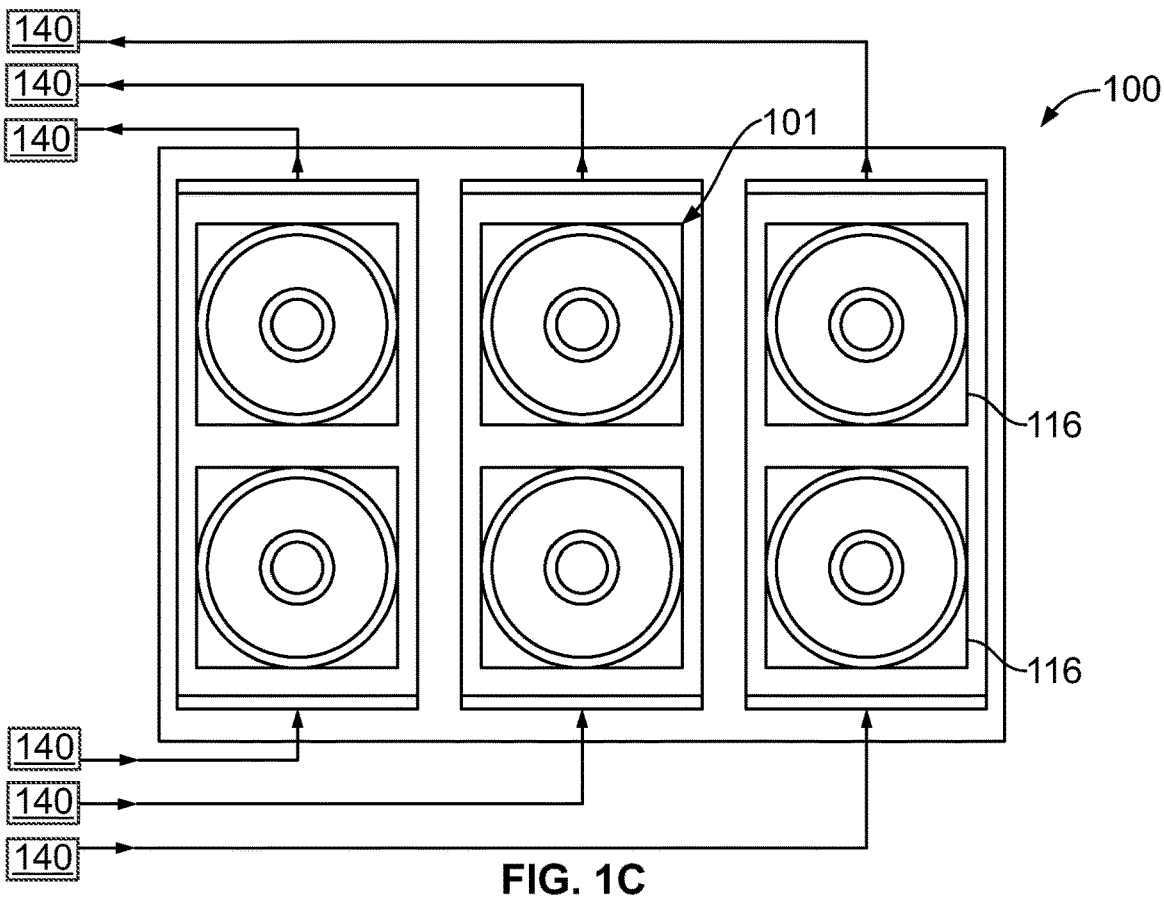

FIGS. 1A through 1C illustrate examples of thermal management systems 100 including of a plurality of thermal management assemblies 101 each having monolithic foil structures 116 in accordance with one or more embodiments described herein. FIG. 1A illustrates an example of a thermal management system 100 that includes a plurality of monolithic foil structures 116 arranged such that an inlet end 126 (shown in FIG. 2) of the internal surface of one or more of the plurality of monolithic foil structures 116 are operatively coupled to a common fluid source 140. FIG. 1B illustrates an example of a thermal management system 100 that includes a plurality of monolithic foil structures 116 arranged such that the inlet ends 126 of the internal surface of some of the plurality of monolithic foil structures 116 are operatively coupled to a different fluid sources 140. FIG. 1C illustrates an example of a thermal management system 100 that includes a plurality of monolithic foil structures 116 arranged such that the inlet end 126 of the internal surface of all of the plurality of monolithic foil structures 116 are operatively coupled to different fluid sources 140.

The thermal management systems shown in FIGS. 1A through 1C may be distributed heat exchanger systems. In each of the examples of FIGS. 1A through 1C, outlet ends 128 (shown in FIG. 3) of the internal surface are operatively coupled to respective subsystems (e.g., oil subsystems, air subsystems, cooling subsystems, or any other system requiring heat transfer or operation of which is improved by heat transfer) to accomplish different thermal management applications. Optionally, the assembly includes that the inlet end of the internal surface of one or more of the plurality of monolithic foil structures are operatively coupled to a common fluid source. Optionally, the assembly includes that the inlet end of the internal surface of at least two of the plurality of monolithic foil structures are operably coupled to different fluid sources. Optionally, the assembly includes that the body includes fins projecting from the external surface at orthogonal and/or non-orthogonal angles relative to an underlying portion of the external surface. Optionally, the assembly includes that the fins are staggered with respect to adjacent fins. Optionally, the assembly includes that the fins are spaced apart from the bodies of the remaining ones of the monolithic foil structures.

Figure 2:
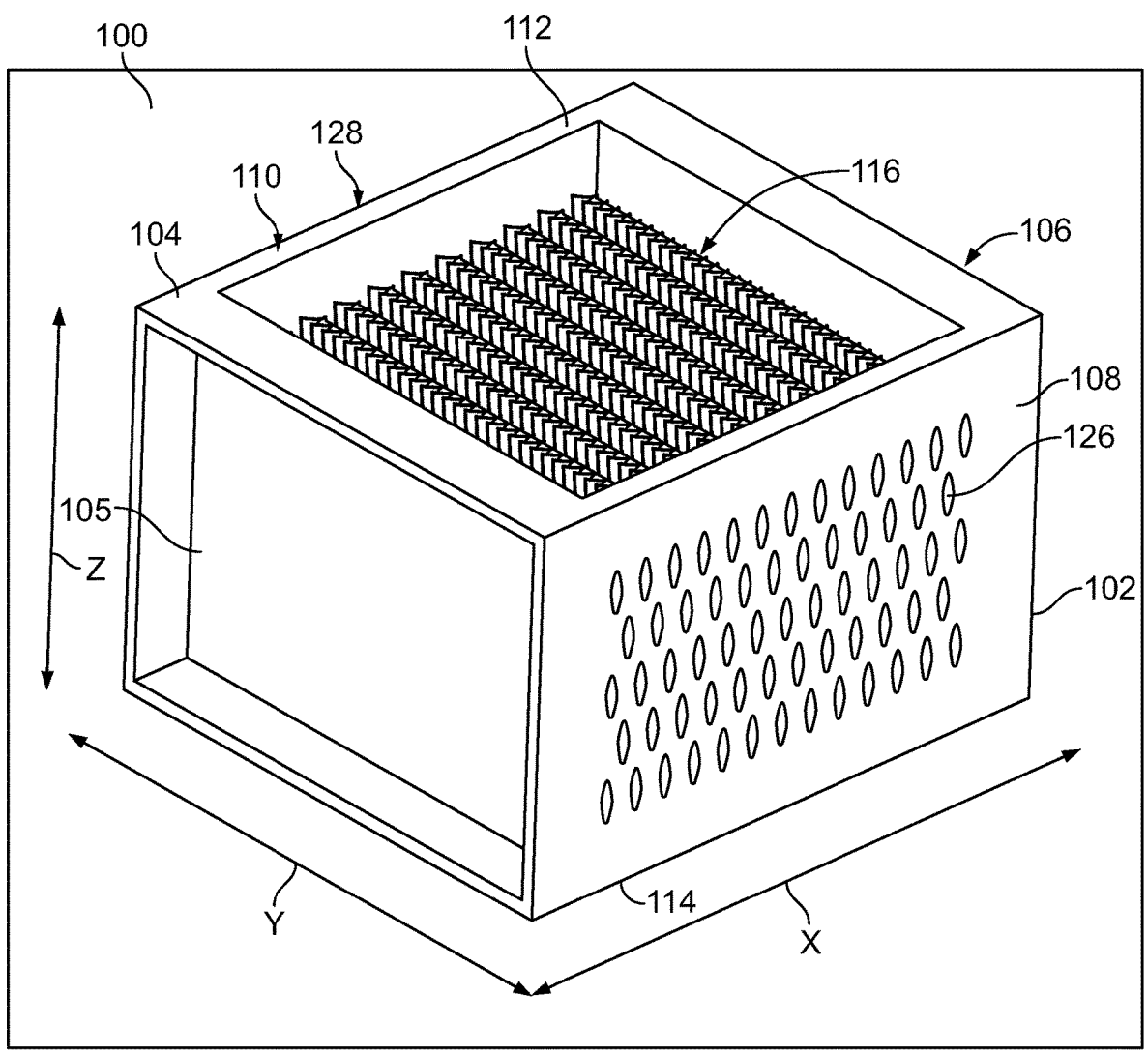
FIG. 2 illustrates an example of a thermal management assembly in accordance with one or more embodiments herein.

FIG. 2 illustrates an example of a thermal management assembly 101 in accordance with one or more embodiments herein. The thermal management assembly 101 is discussed in terms of a heat exchanger to explain its operation. The thermal management systems shown in FIGS. 1A through 1C may include several of the assemblies 101. A core 102 (e.g., a heat exchanger core) may include an external housing 104 that extends between a first side 105 and a second side 106 along a first direction, e.g., the X-direction. In addition, the external housing 104 extends between a third side 108 and a fourth side 110 along a second direction, e.g., the Y-direction. The external housing also extends between a fifth side 112 and a sixth side 114 along a third direction, e.g., the Z-direction. The X-direction, the Y-direction, and the Z-direction can be mutually perpendicular with one another, such that an orthogonal coordinate system is defined. The heat exchanger and the X-Y-Z coordinate system are used herein only for the purpose of explaining aspects of the subject matter and are not intended to limit the scope of the disclosure. For example, the core 102 may be cylindrical and best described using, e.g., a cylindrical coordinate system. In this regard, directional indicators such as "left" and "right," "front" and "back," and "top" and "bottom" are only used to indicate the relative positioning of two sides of heat exchanger along the X-direction, the Y-direction, and the Z-direction, respectively.

Figure 3:
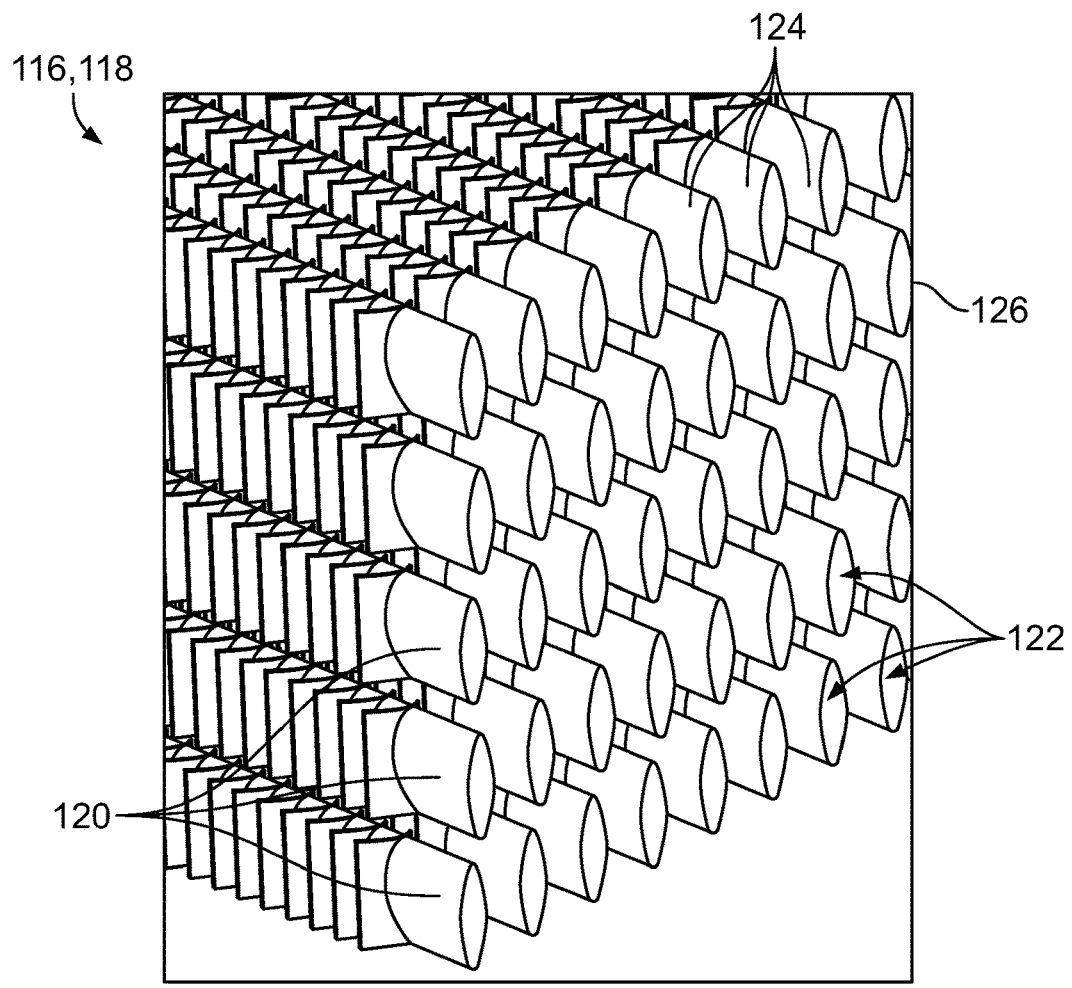
FIG. 3 illustrates one example of a monolithic foil structure of the core of the thermal management assembly of FIG. 2 in accordance with one or more embodiments herein.

FIG. 3 illustrates one example of a monolithic foil structure 116 of the core 102 of the thermal management assembly 101 in accordance with one or more embodiments herein. A monolithic structure can include a system, structure, geometry, feature, or combination thereof that is a single and integrated structure. For example, monolithic structures can be formed, printed, cast, or the like, as a single piece and lack any seams, or joints, although other materials can be subsequently joined thereto.

The monolithic foil structure 116 has a body 118 with an opposite external surface 120 and internal surface 122. The external surface forms an outer profile. Portions of the internal surface oppose each other to form one or more internal conduits, such as a pipes, channels, or the like, that define at least an internal passage that can convey or direct a fluid (e.g., a liquid or a gas). The external surface and the internal surface may have the same or different shapes relative to each other, as discussed further below. No seams, joints, or welds are present in the body between the external and the internal surface in the illustrated embodiment. In use, the monolithic foil structure physically isolates a first fluid flowing along the external surface from a second fluid flowing in the one or more internal conduits. The body can transfer thermal energy between the fluid flowing along the external surface and the fluid flowing in the internal conduit formed by the internal surface.

The shape, contour, configuration and surface profile of the outer profile may be selected with reference to end use parameters and requirements. In one embodiment, portions of the outer profile formed by the external surface and/or the one or more internal conduits formed by the internal surface may be foil-shaped. For example, the outer profile and/or the internal conduit may have a shape that, when oriented at a suitable angle, guides an oncoming fluid (e.g., a liquid or a gas). The external surface's profile may manage (e.g., increase or otherwise improve, relative to designs with other profiles) heat transfer from the implemented foil-shaped features to the oncoming fluid. The external surface's profile may manage (e.g., improve) pressure drop across the system for the flow of oncoming fluid. Suitable foil shapes include at least part of ovoids, tear-drop shapes, or the like. Foil shapes can be one or more of, for example and without limitation, symmetric, asymmetric, cambered, non-cambered, reflexed, non-reflexed, and the like. Foil shapes can include aerodynamically optimized profiles on the air sides of the shapes. For example, instead of having an airfoil shape, the bodies can have an optimized shape from aerodynamic and thermodynamic considerations, such as a leading edge having the shape of an airfoil and a trailing edge having a circular radius. The outer profile and/or the internal conduit may be foil-shaped to improve heat transfer. Such foil shapes may reduce flow separation relative to that seen with conventional shapes (e.g., circular shapes and the like). As one example, based on portions of the external surface of the outer profile having foil shapes, the external surface direct fluid flowing along the external surface to downstream portions of the external surface (e.g., along the Z-direction of FIG. 1), thereby reducing pressure drop and energy consumed in dissipating heat in the thermal management system. By using asymmetric foils, the macro flow of the oncoming fluid through the system may be controlled. For example, the pressure drop can be controlled to be greater (or lesser) at a peripheral edge relative to a more central flow region.

In one or more embodiments herein, corresponding portions of the external surface of the outer profile and the one or more internal conduits formed by the internal surface form individual channels 124 of the body of the monolithic foil structure. Each channel extends from an inlet end 126 to an outlet end 128 of the monolithic foil structure. The channels may be arranged with respect to each other in a spatial orientations selected based on application specific parameters. Suitable orientations may include, for example and without limitation, one or more of parallel, tilted, cambered, clover-shaped, and the like, in order to manage thermal performance for a given application. Additionally or alternatively, in other embodiments the channels may be straight or at least a portion of the channels may be curved in two or more dimensions (e.g., to increase the dwell time of the second fluid).

Figure 4:
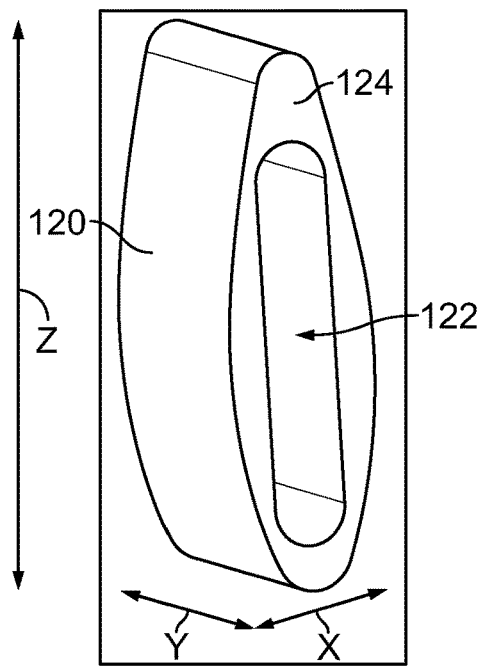
FIG. 4 illustrates a close-up view of one example of the external surface and the internal conduit of FIG. 3 in accordance with one or more embodiments herein.

FIG. 4 illustrates a close-up view of one example of a portion of the external surface and an internal conduit of FIG. 3 in accordance with one or more embodiments herein. Portions of the external surface of the outer profile or the one or more internal conduits formed by the internal surface may have an asymmetric shape and/or a symmetric shape relative to a common cross-sectional plane defined by the X- and Z-directions of FIG. 2. In one example, the portions of the external surface of the outer profile may have a symmetric shape (e.g., a symmetric foil shape) and the one or more internal conduits formed by the internal surface may have a symmetric shape (e.g., a circular shape, a rounded rectangular shape, an oval shape). In another example, the portions of the external surface of the outer profile may have an asymmetric shape (e.g., an asymmetric foil shape) and the one or more internal conduits formed by the internal surface may have a symmetric shape. Symmetric shapes of the internal conduit may facilitate the passage of the second fluid flowing therein (e.g., by developing the boundary layer faster than non-symmetric shapes, increasing heat transfer along the length of the conduit), while the symmetric or asymmetric foil shapes may reduce the pressure drop of the first fluid flowing along the external surface and energy consumed in dissipating heat in the thermal management system. Additionally or alternatively, one or more of portions of the external surface of the outer profile and/or the one or more internal conduits formed by the internal surface may have shapes that vary along one or more of the X-, Y-, or Z-directions of the monolithic foil structure. In one example, portions of the outer profile of the external surface of may have a shape (e.g., a foil shape) that varies relative to a common cross-sectional plane defined by the X- and Z-directions along the channel length (e.g., in Y-direction in FIG. 2). For example, one or more dimensions of the shape may vary at different positions along the length of the channel. Additionally or alternatively, portions of the outer profile of the external surface may have shapes that vary relative to a common cross-sectional plane defined by the X- and Z-directions along a flow direction of the first fluid flowing along the external surface (e.g., in the Z-direction in FIG. 2). For example, portions of the outer profile of the external surface may have a first shape at a first position along the Z-direction and a second shape that is different than the first shape at a second position along the Z-direction that is spaced apart from the first position. In an additional or alternative example, the one or more internal conduits formed by the internal surface may have a shape that varies along the channel length (e.g., in Y-direction in FIG. 2)

relative to a common cross-sectional plane defined by the X- and Z-directions. For example, one or more dimensions of the shape may vary at different positions along the length of the channel such as by changing from a rounded rectangle to a circular or elliptical shape or vice versa. Variation in the shape of the external surface and/or the internal conduits may be used to manage the thermal management parameters (e.g., the heat transfer parameters, the temperature differential, etc.) of the thermal management system based on the requirements of specific applications by changing the ratio of surface area-to-volume, managing the pressure drop across the system, managing the temperature differential between the first and second fluids, and the like.

Figure 5:
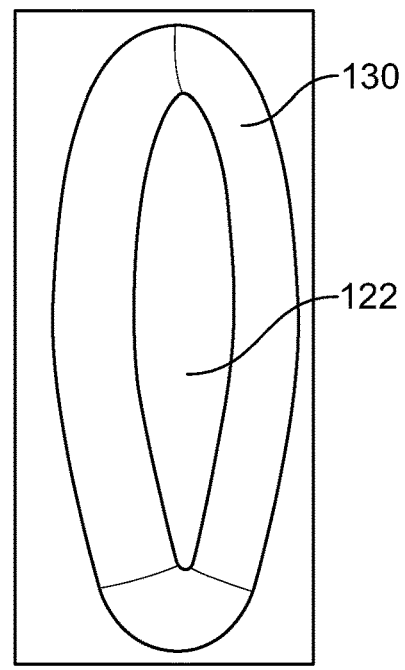
FIG. 5 illustrates a close-up view of one example of the internal surface of the body of the monolithic foil structure at an inlet end or an outlet end in accordance with one or more embodiments herein.

FIG. 5 illustrates a close-up view of one example of the internal surface of the body 118 of the monolithic foil structure 116 at an inlet end 126 or an outlet end 128 thereof in accordance with one or more embodiments herein. Portions of the internal surface of the body extend from the inlet end of the body to the opposite outlet end of the body. Edges 130 of the internal surface may be rounded at the inlet end and/or the outlet end of the body. For example, instead of the internal surface and the surface of the inlet end and/or outlet end meeting at a ninety degree angle at the edge(s), the interface between the internal surface and the surface of the inlet end and/or outlet end may be a rounded edge having a radius of curvature. In various embodiments, the edge(s) may be rounded and/or contoured by implementing one or more of a radial fillet, a chamfer, a foil shape, or an elliptical profile where the internal surface meets the inlet end or the outlet end of the body (e.g., at end plates of the third side 108 and fourth side 110). The edge(s) may decrease entry and/or exit pressure losses, and thus decrease the energy required to circulate the second fluid flowing in the internal conduit relative to, e.g., other cores (e.g., heat exchanger cores) that have sharp or angled edges. Reducing entry and/or exit pressure losses becomes more important with increasing flow rates of the second fluid and the rounded and/or contoured edge(s) reduce the power consumed for fluid circulation due to proportionality between the power consumed, the pressure drop at the edge(s), and the fluid flow rate.

Figure 6:
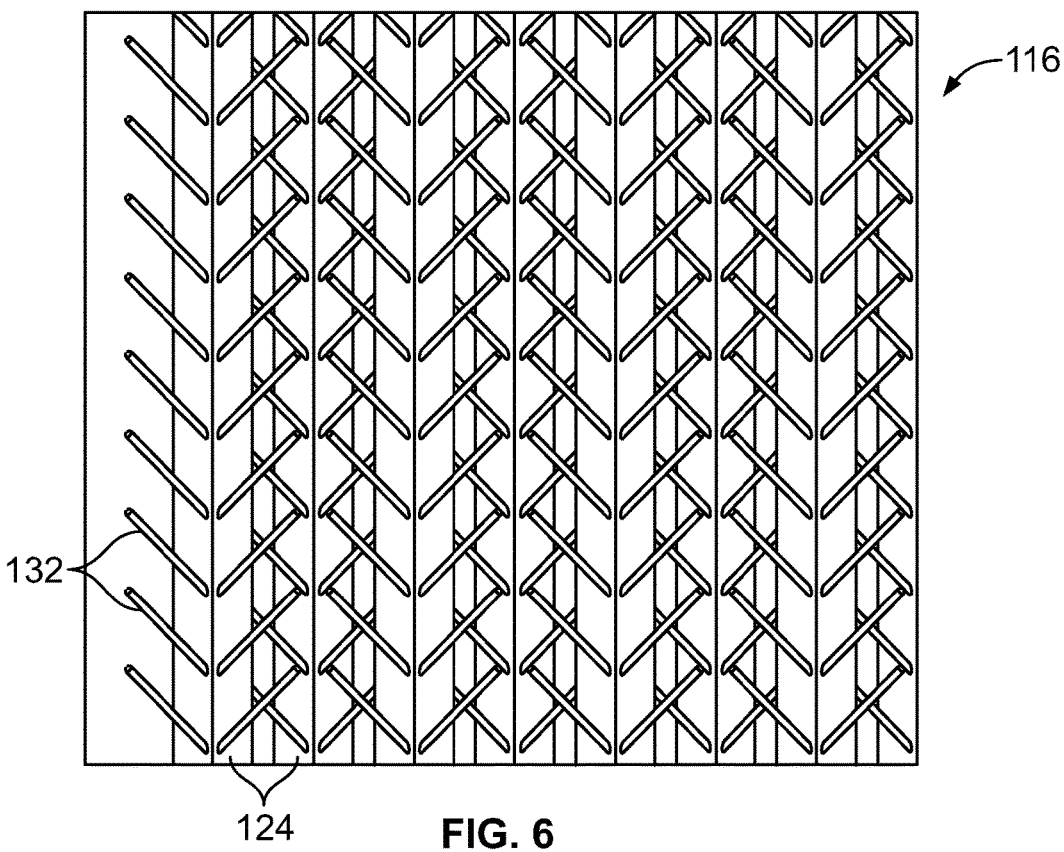
FIG. 6 illustrates a close-up, top view of the monolithic foil structure of FIG. 3 in accordance with one or more embodiments herein.
Figure 7:
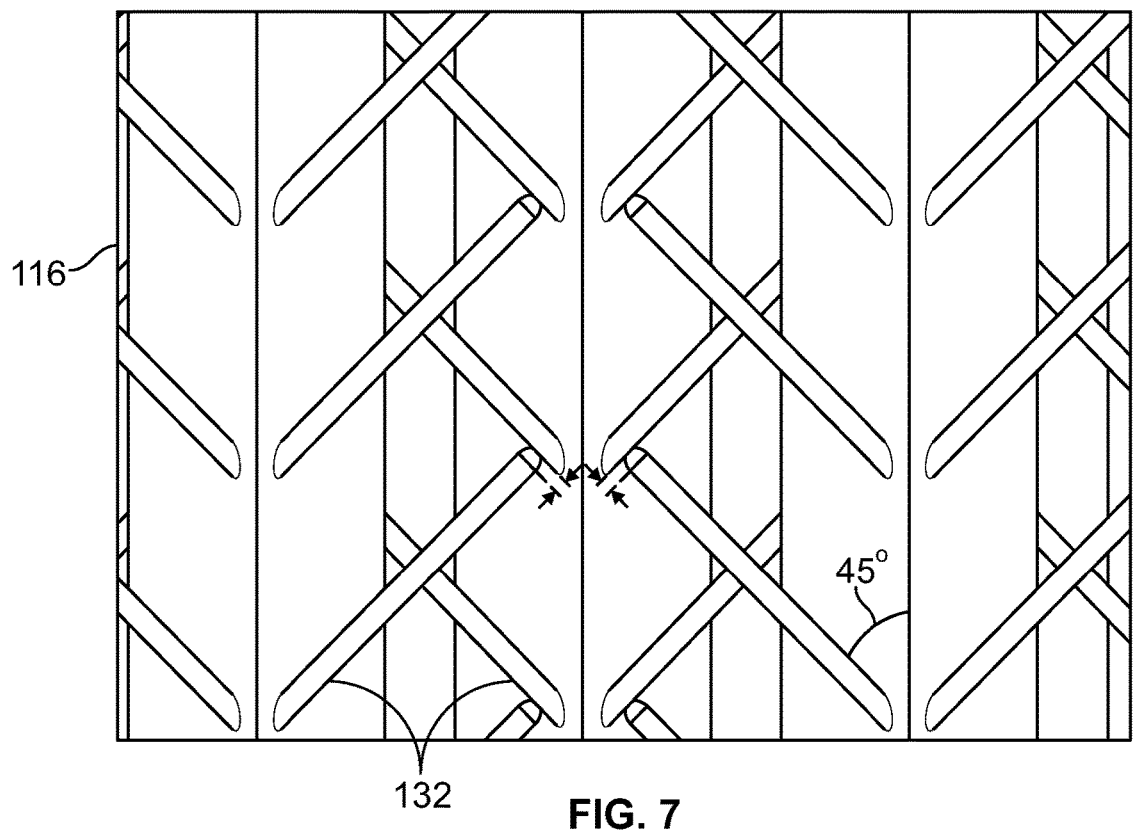
FIG. 7 illustrates another close-up, top view of the monolithic foil structure of FIG. 3 in accordance with one or more embodiments herein.

FIGS. 6 and 7 illustrate close-up, top views of the monolithic foil structure 116 of FIG. 3 in accordance with one or more embodiments herein. The body of the monolithic foil structure 116 may include fins 132 coupled to and projecting from the external surface. The fins may be coupled to and project from the external surface at non-orthogonal angles relative to an underlying portion of the external surface. For example, the fins may project at 45-degree angles relative to the underlying portion of the external surface. Optionally, the fins may project at orthogonal angles relative to an underlying portion of the external surface. Alternatively, some fins may project at orthogonal angles relative to an underlying portion of the external surface while other fins project at non-orthogonal angles relative to the underlying portion of the external surface. Additionally or alternatively, in other embodiments the fins may project at 45-degree angles relative to the inlet end and/or the outlet end of the body (e.g., at end plates of the third side and fourth side). The fins may be sized, shaped, oriented and/or positioned so as to not contact other fins.

The fins may be spaced apart in a plane formed by the X- and Y-directions from adjacent fins at different positions along the Z-direction. For example, the fins may be staggered or spaced apart in a plane formed by the X- and Y-direction with respect to the fins extending from upstream or downstream portions of the external surface (e.g., staggered with respect to adjacent upstream or downstream channels 124) along the Z-direction. Spacing the fins in the plane formed by the X- and Y-directions along the Z-direction may eliminate "dead zones" in the flow path of the fluid that may reduce the obstruction of downstream fins from upstream fins. Reducing obstruction of downstream fins with respect to the direction of fluid flow enables increased contact of fluids flowing along the external surface and, thus, increased heat transfer for the thermal management system.

In one or more embodiments herein, the fins may be coupled to and project outward from portions of the external surface corresponding to a first channel 124 and extend towards, but remain spaced apart from other portions of the external surface (e.g., from the external surfaces 120 corresponding to other channels). For example, the fins may be cantilevered fins. The fins may be spaced apart by a gap (e.g., two millimeters) from adjacent fins perpendicular to an elongation direction of the fins. Such a fin configuration provides for independent expansion of fins relative to each other and other features, eliminating the thermal stresses that would otherwise occur based on some known fins formed from sheets of material and that are connected to adjacent fins. Additionally or alternatively, other fins may extend between and be coupled to adjacent, spaced apart portions of the external surface. For example, the fins may be formed monolithically with and extend between adjacent channels.

Figure 8:
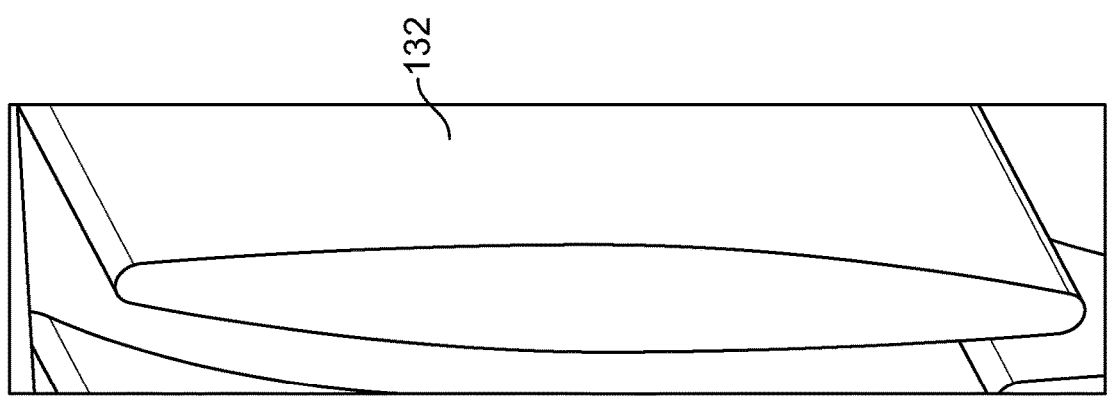
FIG. 8 illustrates a close-up view of one example of a fin of the monolithic foil structure of FIG. 3 in accordance with one or more embodiments herein.

FIG. 8 illustrates a close-up view of one example of a fin of the monolithic foil structure of FIG. 3 in accordance with one or more embodiments herein. The fins may have a cross-sectional shape parallel to and/or perpendicular to the elongation direction of the fins that varies along the elongation direction. Additionally or alternatively, in other embodiments the fins may have foil shapes. These other fins may have foil shapes, and may be symmetric or asymmetric foil shapes. Profiling the fins to have foil shapes may manage aerodynamics (e.g., change pressure drops) and control heat transfer performance of the thermal management system.

Figure 9:
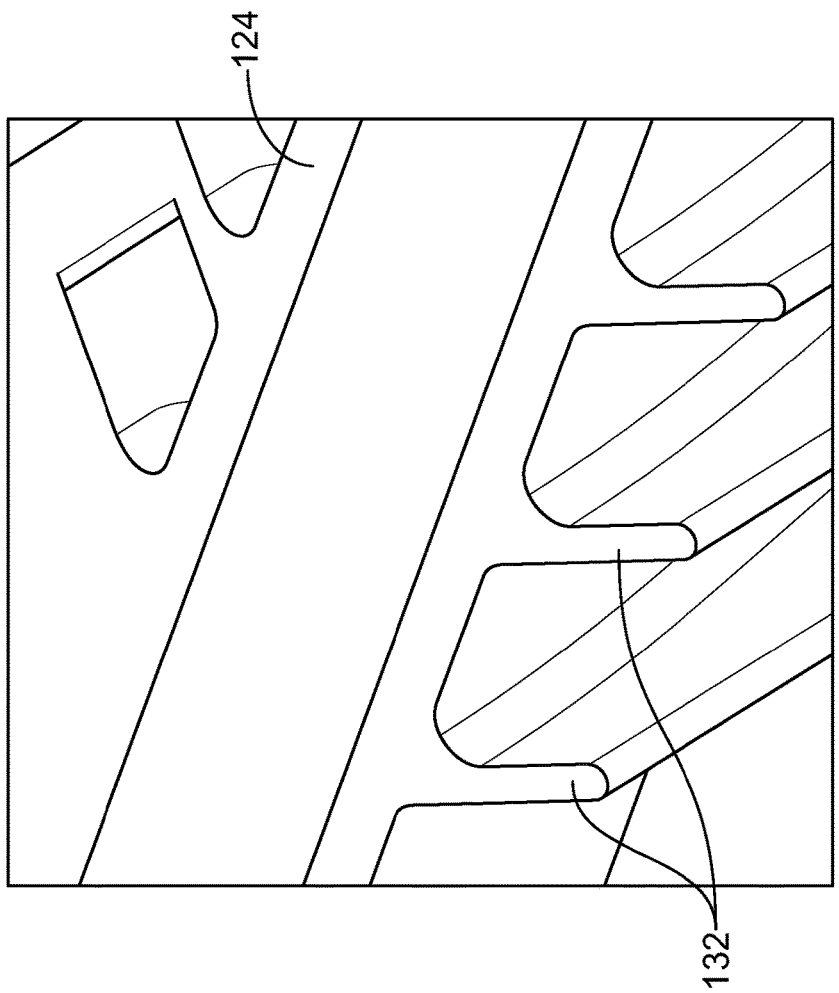
FIG. 9 illustrates a partial cross-sectional view of the of the monolithic foil structure of FIG. 3 in accordance with one or more embodiments herein.

FIG. 9 illustrates a partial cross-sectional view of the of the monolithic foil structure of FIG. 3 in accordance with one or more embodiments herein. The fins may be formed monolithically with the body, e.g., such that no seams, joints, or welds are present between the body and the fins. For example, the fins may be formed monolithically with underlying portions of the external surface. Additionally or alternatively, a thickness of the body from the internal surface to the external surface may be different at different lengths of the body in various embodiments. Variations in the thickness of the body (e.g., at intersections of features such as between fins and portions of the underlying external surface, channels with end plates, etc.) may increase the structural integrity and heat transfer characteristics of the thermal management system. For example, forming the fins monolithically with the channels of the monolithic foil structure may enable localized changes in the thickness of the body (e.g., via rounding and/or contouring otherwise angular transitions between the intersection of the fins and the underlying portions of the external surface using radial fillets, chamfers, or the like) in the region where surfaces of the fins would otherwise angularly project from the external surface. Forming the fins monolithically with the channels may improve the heat path between the channels and fins by eliminating the seams, welds, and joints that would otherwise be present in some known systems. Such localized changes in the thickness of the body may also be used to tailor the local fluid velocities (e.g., by managing turbulence) at such locations to further improve heat transfer characteristics of the thermal management system.

Figure 10:
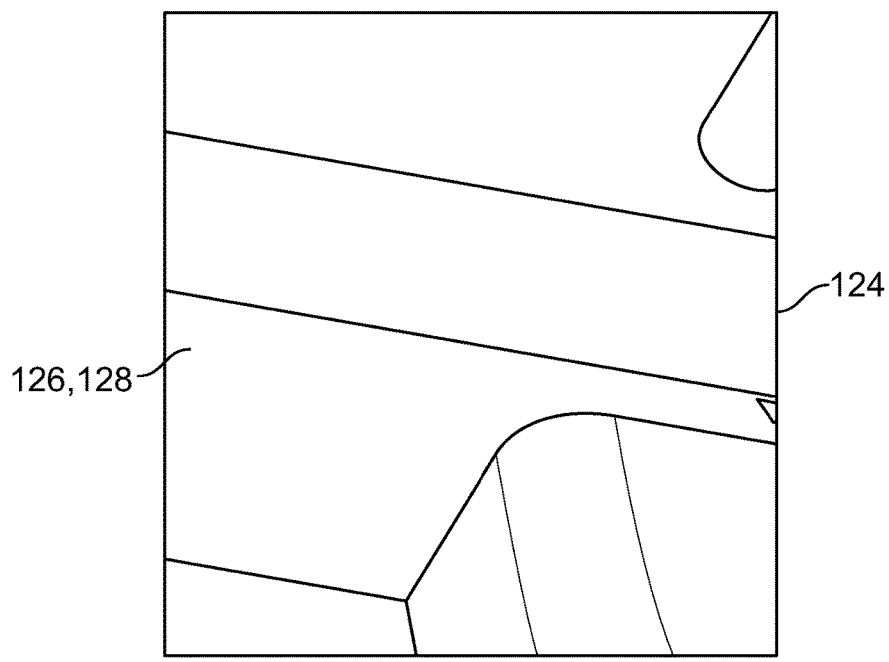
FIG. 10 illustrates a close up view of the of the monolithic foil structure of FIG. 3 in accordance with one or more embodiments herein.

FIG. 10 illustrates a partial view of the of the monolithic foil structure 116 of FIG. 3 in accordance with one or more embodiments herein. The channels 124 may be formed monolithically with inlet and outlet ends (e.g., endplates) of the body, e.g., such that no seams, joints, or welds are present between inlet and outlet ends and the channels. For example, the channels may be formed monolithically with underlying portions of one or more of the inlet end and the outlet end. Additionally or alternatively, one or more sidewalls extending from the inlet end to the outlet end may be formed monolithically with the monolithic foil structure. Additionally or alternatively, forming the channels monolithically with the endplates of the monolithic foil structure enables localized changes in the thickness of the body (e.g., via rounding and/or contouring otherwise angular transitions between the intersection of the channels and the underlying portions of the endplates using radial fillets, chamfers, or the like) in the region where surfaces of the channels would otherwise angularly project from the endplates.

Optionally, the system includes that the body transfers thermal energy between the fluid flowing along the external surface and the fluid flowing in the internal conduit. Optionally, the system includes wherein one of the outer profile formed by the external surface and the internal conduit formed by the internal surface is an asymmetric shape and the remaining one is a symmetric shape relative to a common a common cross-sectional plane. Optionally, the system includes that the asymmetric shape is a foil shape.

Optionally, the system includes that the symmetric shape is a rounded rectangle. Optionally, the system includes that the symmetric shape is different at different lengths of the body. Optionally, the system includes that the internal surface of the body extends from an inlet end of the body to an opposite outlet end of the body, and edges of the internal surface are rounded at the inlet end of the body.

Optionally, the system includes that the internal surface of the body extends from an inlet end of the body to an opposite outlet end of the body, and edges of the internal surface are rounded at the outlet end of the body. Optionally, the system includes that a thickness of the body from the internal surface to the external surface is different at different lengths of the body. Optionally, the system includes that no seams, joints, or welds are present in the body between the internal and the external surfaces. Optionally, the system includes that the body includes fins projecting from the external surface at non-orthogonal angles relative to an underlying portion of the external surface. Optionally, the system includes that no seams, joints, or welds are present between body and fins. Optionally, the system includes that the fins have foil shapes.

Figure 11A:
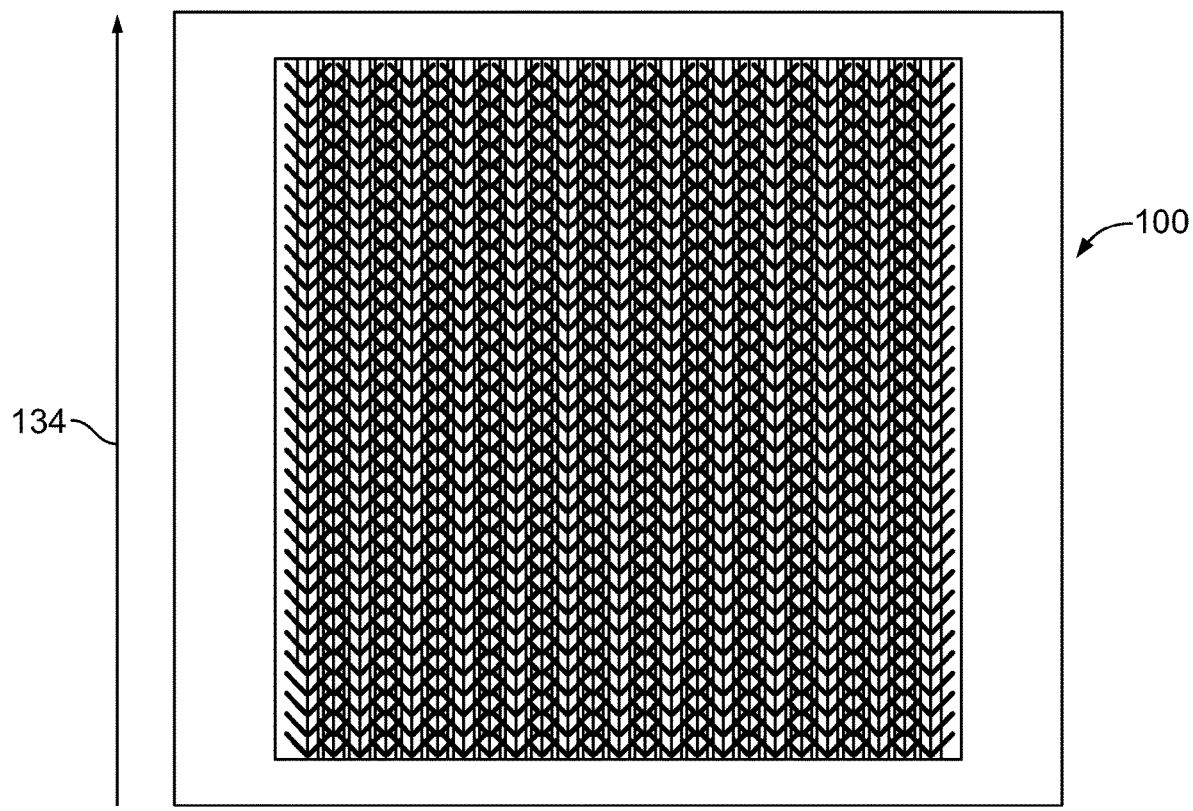
FIG. 11A illustrates a schematic showing aspects of one example of additively manufacturing at least a portion of a thermal management system in accordance with one or more embodiments herein.
Figure 11B:
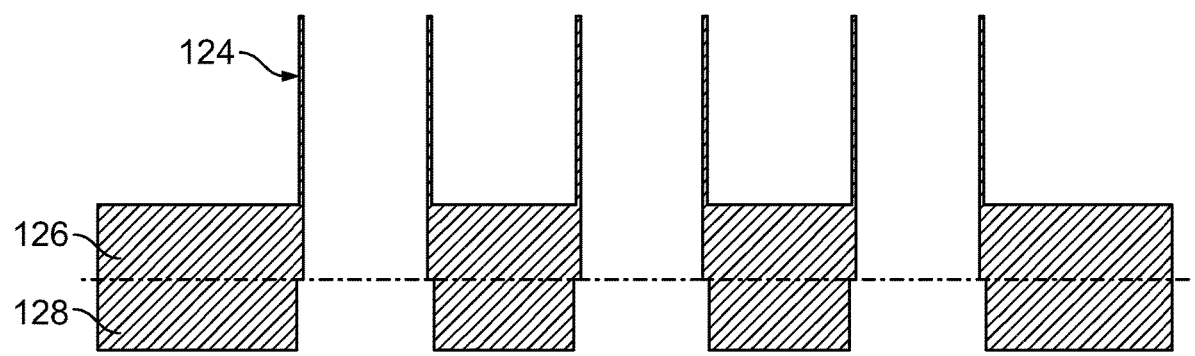
FIG. 11B illustrates a schematic showing aspects of an additional or alternative example of additively manufacturing at least a portion of a thermal management system in accordance with one or more embodiments herein.

FIG. 11A illustrates a schematic showing aspects of one example of additively manufacturing at least a portion of a thermal management system 100 in accordance with one or more embodiments herein. Additively manufacturing at least a portion of a thermal management system 100 includes additively manufacturing at least a monolithic foil structure 116. The method commences with forming a first layer of material on a build platform. Arrow 134 indicates the build direction for the thermal management system 100. One or more additional, second layers of the material are formed above the first layer to additively manufacture a monolithic foil structure 116 having a body with opposite external and internal surfaces 120, 122 that, respectively, form an outer profile and an internal conduit having different shapes. (Here, the term "second" is used as a label to differentiate these additional layers from the first layer. Thus, there may be one "second" layer or plural "second" layers, which may have the same configuration or different configurations.) The monolithic foil structure 116 physically isolates a first fluid flowing along the external surface from a second fluid flowing in the one or more internal conduits defined by the internal surface. Optionally, one or more additional, third layers of the material above the first layer may be formed to additively manufacture a monolithic housing base plate (e.g., the end plate of the third side 108 or fourth side 110) integrally with the monolithic foil structure 116. (Again, "third" does not necessarily reflect a total number or order of layers, but rather distinguishes these other layers from the first layer and the one or more second layer(s)). Additionally or alternatively, as illustrated in FIG. 10B, one or more additional layers of the material above the first layer may be formed to additively manufacture two monolithic housing base plates integrally with the monolithic foil structure. Here, the end plate of the inlet end (e.g., the end plate of the third side or the fourth side) can be separated from the end plate of the outlet end (e.g., the remaining one of the end plates) using, e.g., wire electrical discharge machining. The separated end plate can then be joined to the opposite end of the monolithic foil structure.

While embodiments of the invention are shown and described herein using heat exchangers and thermal management systems as examples, other embodiments may include other end use cases. For example, rather than thermal transfer between two fluids the body may be formed from selectively porous material such that constituents from one fluid transport through the body to become part of the second fluid stream.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

The subject matter described herein is not limited in its application to the details of construction and the arrangement of components set forth in the description herein or illustrated in the drawings hereof. The subject matter described herein is capable of other embodiments and of being practiced or of being carried out in various ways. The phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A or B" (where "A" and "B" represent claim elements), are used to encompass i) A, ii) B and/or iii) both A and B.

This written description uses examples to disclose the embodiments, including a best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are within the scope of the claims if they have structural elements that do not differ from the literal language of the claims, or if they include equivalent structural elements with insubstantial differences from the literal language of the claims.

What is claimed is:

1. A system, comprising:
a plurality of thermal management assemblies, each of the thermal management assemblies having a monolithic foil structure that includes a body with an external surface and an opposite internal surface that is shaped differently than the external surface, the external surface forming an outer profile and the internal surface forming an internal conduit extending between an inlet end and an outlet end with the outer profile and the internal conduit having different shapes such that the shape of the outer profile of the external surface is asymmetric and the shape of the internal conduit is symmetric in a cross-sectional plane extending along a length of the internal conduit, the internal surface being rounded at an interface between the internal surface and each of the inlet end and the outlet end, the body also including fins projecting from the external surface of the body with the fins of a first thermal management assembly of the thermal management assemblies crossing over and disposed above the fins of a second thermal management assembly of the thermal management assemblies relative to the cross-sectional plane, the first thermal management assembly located adjacent to the second thermal management assembly, the monolithic foil structure configured to physically isolate a first fluid flowing along the external surface from a second fluid flowing in the internal conduit, wherein the body is configured to transfer thermal energy between the first fluid flowing along the external surface and the second fluid flowing in the internal conduit.

2. The system of claim 1, wherein the internal surface has a cross-sectional profile that is wider at the cross-sectional plane than in locations farther from the cross-sectional plane.

3. The system of claim 1, wherein the outer profile formed by the external surface has a leading side with a smaller radius of curvature than a trailing edge of the outer profile.

4. The system of claim 1, wherein the internal surface is rounded.

5. The system of claim 1, wherein the shape of the internal conduit is symmetric but differs at different locations along a length of the body.

6. The system of claim 1, wherein a thickness of the body from the internal surface to the external surface is different at different locations along a length of the body.

7. The system of claim 1, wherein no seams, joints, or welds are present in the body between the internal and the external surfaces.

8. The system of claim 1, wherein the fins project from the external surface at non-orthogonal angles relative to an underlying portion of the external surface.

9. The system of claim 1, wherein no seams, joints, or welds are present between the external surface of the body and the fins.

10. The system of claim 1, wherein the fins have foil shapes.

11. The system of claim 1, wherein the outer profile of the external surface of the body has an ovoid shape.

12. The system of claim 11, wherein the ovoid shape of the outer profile of the external surface of the body is configured to reduce a pressure drop of the first fluid flowing orthogonal to the cross-sectional plane.

13. An assembly, comprising:
a plurality of monolithic foil structures, each of the monolithic foil structures having a body with opposite external and internal surfaces that, respectively, form an asymmetric outer profile relative to a cross-sectional plane and a symmetric internal conduit relative to the cross-sectional plane, the outer profile and the internal conduit having different shapes, the internal surface of the body extending from an inlet end of the body to an opposite outlet end of the body, the internal surface being rounded at an interface between the internal surface and each of the inlet end and the outlet end, the body also including fins projecting from the external surface of the body with the fins of a first monolithic foil structure of the monolithic foil structures disposed crossing over and above the fins of a second monolithic foil structure of the monolithic foil structures relative to the cross-sectional plane, the first monolithic foil structure located adjacent to the second monolithic foil structure, the body configured to physically isolate a first fluid flowing along the external surface from a second fluid flowing in the internal conduit, the body configured to transfer thermal energy between the first fluid flowing along external surface and the second fluid flowing in the internal conduit.

14. The assembly of claim 13, wherein the inlet ends of the internal surfaces of the plurality of monolithic foil structures are operatively coupled to a common fluid source of the second fluid.

15. The assembly of claim 13, wherein the inlet ends of the internal surfaces of at least two of the monolithic foil structures are operably coupled to different fluid sources of the second fluid.

16. The assembly of claim 13, wherein the fins project from the external surfaces at non-orthogonal angles relative to underlying portions of the external surfaces.

17. The assembly of claim 13, wherein some of the fins have a staggered leading edge with respect to adjacent fins.

18. The assembly of claim 13, wherein the fins of the first monolithic foil structure are spaced apart from the bodies of remaining ones of the monolithic foil structures.

19. The assembly of claim 13, wherein the outer profile of the external surface of the body has an ovoid shape configured to reduce a pressure drop of the first fluid flowing orthogonal to the cross-sectional plane.

20. A method, comprising:
forming a first layer of material on a build platform; and
forming one or more additional, second layers of the material above the first layer to additively manufacture a monolithic foil structure having a body with opposite external and internal surfaces that, respectively, form an outer profile and an internal conduit having different shapes, the shape of the outer profile being asymmetric on opposite sides of a cross-sectional plane extending along a length of the internal conduit, the shape of the internal conduit being symmetric on the opposite sides of the cross-sectional plane, the internal conduit extending from an inlet end to an outlet end with the internal surface being rounded at an intersection between the internal surface and each of the inlet end and the outlet end, the body including fins projecting from the body at non-orthogonal angles, wherein the monolithic foil structure is configured to physically isolate a first fluid flowing along the external surface from a second fluid flowing in the internal conduit while transferring thermal energy between the first fluid and the second fluid.

\* \* \* \* \*